(12) United States Patent
Critchley et al.

(10) Patent No.: US 11,043,118 B1
(45) Date of Patent: Jun. 22, 2021

(54) SYSTEM AND METHOD FOR VEHICLE IDENTIFICATION

(71) Applicant: Continental Automotive Systems, Inc., Auburn Hills, MI (US)

(72) Inventors: James H. Critchley, Lake Orion, MI (US); Rodrigo Flores Maldonado, Corregidora (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/724,480

(22) Filed: Dec. 23, 2019

(51) Int. Cl.
*G08G 1/01* (2006.01)
*G08G 1/017* (2006.01)
*G08G 1/052* (2006.01)

(52) U.S. Cl.
CPC ............ *G08G 1/017* (2013.01); *G08G 1/012* (2013.01); *G08G 1/052* (2013.01)

(58) Field of Classification Search
CPC ......... G08G 1/017; G08G 1/012; G08G 1/052
See application file for complete search history.

(56) References Cited

U.S. PATENT DOCUMENTS

| 9,581,997 | B1* | 2/2017 | Penilla | G05D 1/0011 |
| 9,952,594 | B1* | 4/2018 | Zhao | G06K 9/00651 |
| 2003/0226467 | A1* | 12/2003 | Nardone | F42B 12/58 |
| | | | | 102/489 |
| 2009/0028536 | A1 | 1/2009 | Benson et al. | |
| 2009/0254249 | A1 | 10/2009 | Ghoneim et al. | |
| 2010/0217533 | A1 | 8/2010 | Nadkarni et al. | |
| 2014/0179353 | A1* | 6/2014 | Simon | H04W 4/023 |
| | | | | 455/456.2 |
| 2015/0002745 | A1* | 1/2015 | Bernal | G06K 9/00785 |
| | | | | 348/575 |
| 2015/0149022 | A1* | 5/2015 | Harvey | G05D 1/0297 |
| | | | | 701/23 |
| 2015/0370255 | A1* | 12/2015 | Harvey | G05D 1/0027 |
| | | | | 701/24 |
| 2018/0229719 | A1* | 8/2018 | Izumi | B62D 15/0285 |
| 2018/0286222 | A1* | 10/2018 | Urano | G08G 1/017 |
| 2019/0130762 | A1 | 5/2019 | Yang et al. | |
| 2019/0139409 | A1* | 5/2019 | Longardner | G06K 9/3258 |
| 2019/0283736 | A1* | 9/2019 | Watanabe | B60W 30/06 |
| 2019/0287400 | A1* | 9/2019 | Cao | G08G 1/0175 |
| 2020/0105130 | A1* | 4/2020 | Chen | G06N 20/00 |
| 2020/0175868 | A1* | 6/2020 | Reisbick | G08G 1/142 |
| 2020/0184235 | A1* | 6/2020 | Kwon | G06K 9/00805 |
| 2020/0307648 | A1* | 10/2020 | Noguchi | G06Q 10/02 |

OTHER PUBLICATIONS

Shokravi et al., A Review on Vehicle Classification and Potential Use of Smart Vehicle-Assisted Techniques (Year: 2020).*
Derder et al., Target Tracking in VANETs Using V2I and V2V Communiation (Year: 2014).*

(Continued)

*Primary Examiner* — Quang Pham

(57) ABSTRACT

A method of identifying a target vehicle in a system includes providing a sensor within a system. Motion data of a plurality of vehicles within the system is detected with the sensor. Broadcast motion data is received from a vehicle unit within the system. Which of the plurality of vehicles is a target vehicle is determined based on a comparison of the detected motion data and the broadcast motion data.

17 Claims, 6 Drawing Sheets

(56) References Cited

OTHER PUBLICATIONS

Reza et al., Tracking an on the run vehicle in a metropolitan VANET (Year: 2013).*
Zhu et al., Position Based Broadcast Mechanism for InterVehicle Cooperative Warning (Year: 2009).*
International Search Report and the Written Opinion of the International Searching Authority dated Mar. 22, 2021 for the counterpart PCT Application No. PCT/2020/070932.

* cited by examiner

SYSTEM AND METHOD FOR VEHICLE IDENTIFICATION

BACKGROUND

Intelligent infrastructure systems, such as parking lots and toll booths, may gather data regarding usage, such as by tracking vehicles entering the area. These systems may include various types of sensors that are statically mounted near the system.

Infrastructure sensor systems may communicate with nearby vehicles. Vehicle to outside systems (V2X) communication, such as vehicle-to-vehicle (V2V) communication and vehicle-to-infrastructure (V2I) communication are-increasingly used as inputs to improve vehicle safety and convenience. Smart infrastructure systems may offer features by communicating with a nearby vehicle, such as reserving a parking spot or providing directions to an open parking spot.

SUMMARY

In one exemplary embodiment, a method of identifying a target vehicle in a system includes providing a sensor within a system. Motion data of a plurality of vehicles within the system is detected with the sensor. Broadcast motion data is received from a vehicle unit within the system. Which of the plurality of vehicles is a target vehicle is determined based on a comparison of the detected motion data and the broadcast motion data.

In a further embodiment of any of the above, the detected motion data and the broadcast motion data have the same parameters.

In a further embodiment of any of the above, the detected motion data and the broadcast motion data comprise a vehicle speed.

In a further embodiment of any of the above, the detected motion data and the broadcast motion data comprise a vehicle yaw rate.

In a further embodiment of any of the above, the detected motion data and the broadcast motion data comprise a vertical acceleration.

In a further embodiment of any of the above, the detected motion data and the broadcast motion data comprise at least two parameters.

In a further embodiment of any of the above, the detecting, receiving, and determining steps are performed by a computing module. The computing module is in communication with the sensor and the vehicle unit.

In a further embodiment of any of the above, the computing module is configured to send information to the target vehicle.

In a further embodiment of any of the above, the vehicle unit communicates with the computing module wirelessly.

In a further embodiment of any of the above, broadcast motion data is received from multiple vehicle units within the system.

In a further embodiment of any of the above, the vehicle unit is mounted within one of the plurality of vehicles.

In a further embodiment of any of the above, the vehicle unit is a mobile device located within one of the plurality of vehicles.

In a further embodiment of any of the above, a plurality of sensors is provided within the system.

In a further embodiment of any of the above, the system is a portion of a paid or restricted access area.

In another exemplary embodiment, a system for identifying a target vehicle within a system includes a sensor configured to detect motion data of a plurality of vehicles within a system. A vehicle unit is mounted on a vehicle. The vehicle unit is configured to track motion of the vehicle and broadcast the tracked motion data to the computing module. A computing module is in communication with the sensor and the vehicle unit. The sensor is configured to send the detected motion data to the computing module. The vehicle unit is configured to broadcast the tracked motion data to the computing module. The computing module identifies the vehicle as a target vehicle based on a comparison of the detected motion data and the broadcast motion data.

In a further embodiment of any of the above, the detected motion data and the broadcast motion data comprise at least one of a vehicle speed, a vehicle yaw rate, and a vertical acceleration.

In a further embodiment of any of the above, the detected motion data and the broadcast motion data comprise at least two parameters.

In a further embodiment of any of the above, the vehicle unit is configured to communicate with the computing module wirelessly.

In a further embodiment of any of the above, the computing module is configured to send information to the target vehicle via vehicle unit.

In a further embodiment of any of the above, the computing module is configured to receive broadcast motion data from multiple vehicle units.

BRIEF DESCRIPTION OF THE DRAWINGS

The disclosure can be further understood by reference to the following detailed description when considered in connection with the accompanying drawings wherein.

DETAILED DESCRIPTION

The subject invention provides a system and method for identifying vehicles within a smart system, such as a parking system. A sensor within the parking system tracks the motion of vehicles within the system. A vehicle unit on the vehicle broadcasts motion of the vehicle. The system then determines which vehicle within the system is a target vehicle based on a comparison of the tracked motion data and the broadcast motion data.

Figure 1:
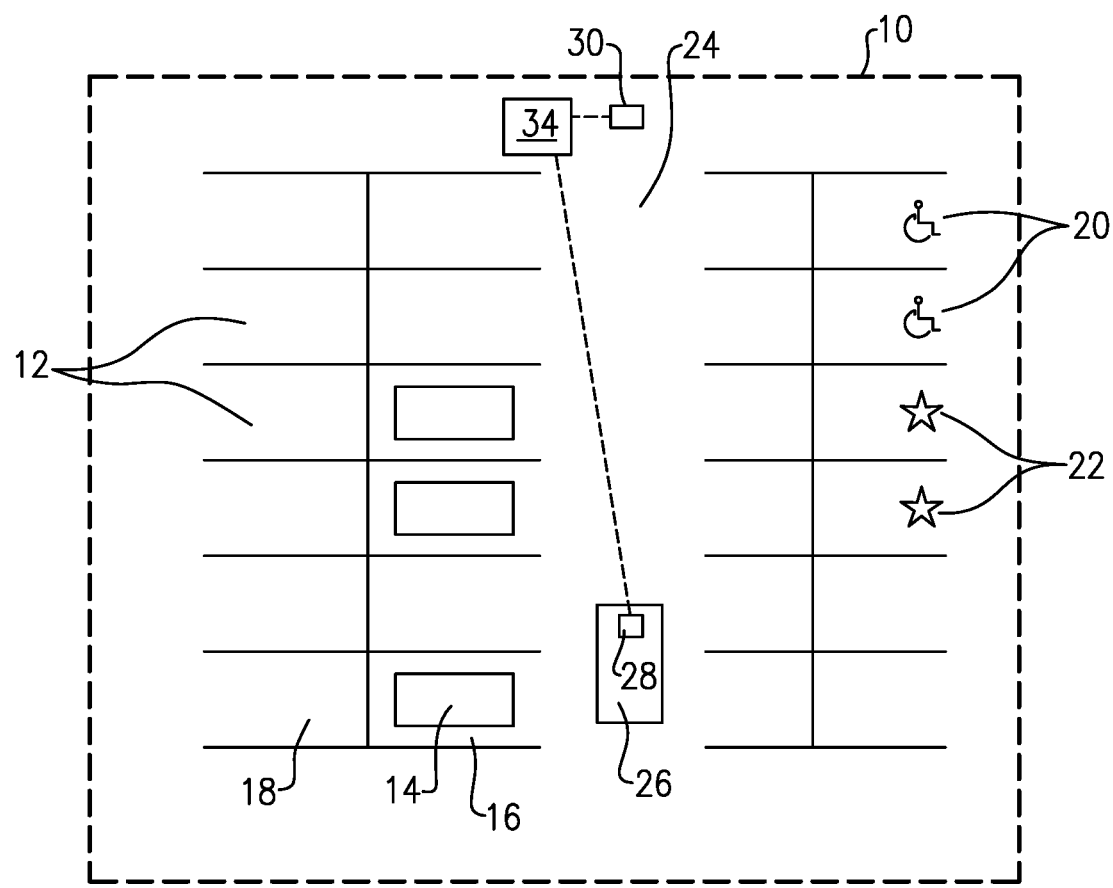
FIG. 1 schematically illustrates an example smart parking lot system.

FIG. 1 illustrates an example smart infrastructure system, such as a parking system 10. The parking system 10 generally includes a plurality of parking spaces 12. The parking spaces 12 may include empty spaces 18 and occupied spaces 16, which are occupied by parked vehicles 14. An aisle 24 extends between the parking spaces 12. In some examples, some of the parking spaces 12 may be designated as handicapped spaces 20 or high priority spaces 22. Although a parking system 10 is shown and described herein, it should be understood that the disclosed system and method may be used for other systems, such as toll systems, for example.

The system 10 generally includes a sensor 30 and a computing module 34. The sensor 30 is in communication with the computing module 34. The sensor 30 may communicate with the computing module 34 via communication hardware, or wirelessly. In other embodiments, the sensor 30 and computing module 34 may be integrated into a single unit. The system 10 may include multiple sensors 30 mounted in different locations within the system 10, each of the sensors 30 in communication with the computing module 34.

The sensor 30 detects and tracks objects, such as vehicles 26, within the system 10. The sensor 30 may be a camera, a radar sensor, a lidar sensor, an ultrasonic sensor, or light beam, for example. The sensor 30 detects motion of the vehicles 26. The sensor 30 then sends detected motion data about the vehicles 26 to the computing module 34. The sensor 30 may detect motion data such as speed, acceleration, yaw rate, and steering angle, for example. The sensor 30 may detect motion data about multiple vehicles 26 within the system 10 simultaneously. The vehicle 26 has a vehicle unit 28 that is in communication with the computing module 34. The vehicle unit 28 detects motion data of the vehicle 26 from aboard the vehicle 26. The vehicle unit 28 may be integrated into the vehicle 26, or may be a smart device located within the vehicle 26, such as a smart phone or tablet. The vehicle unit 28 communicates wirelessly with the computing module 34. The computing module 34 compares the detected motion data from the sensor 30 and the broadcasted motion data from the vehicle unit 28 to pair a particular detected vehicle 26 with a particular subscriber.

The computing module 34 may be calibrated to have data regarding the physical features of the parking system 10. For example, the computing module 34 may be calibrated to have information regarding parking spaces 12 and aisles 24. The sensor 30 may communicate with the computing module 34 via communication hardware, or may communicate wirelessly. The system 10 may use one or more of the following connection classes, for example: WLAN connection, e.g. based on IEEE 802.11, ISM (Industrial, Scientific, Medical Band) connection, Bluetooth® connection, ZigBee connection, UWB (ultrawide band) connection, WiMax® (Worldwide Interoperability for Microwave Access) connection, infrared connection, mobile radio connection, and/or radar-based communication.

The system 10, and in particular the computing module 34, may include one or more controllers comprising a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The computing module 34 may include a hardware device for executing software, particularly software stored in memory, such as an algorithm for comparing motion data. The computing module 34 may include a custom made or commercially available processor, a central processing unit (CPU), an auxiliary processor among several processors associated with the computing module 34, a semiconductor based microprocessor (in the form of a microchip or chip set), or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The controller can be configured to execute software stored within the memory, to communicate data to and from the memory, and to generally control operations of the computing module 34 pursuant to the software. Software in memory, in whole or in part, is read by the processor, perhaps buffered within the processor, and then executed. This software may be used to store and compare the motion data from the sensor 30 and vehicle unit 28, for example.

Intelligent infrastructure services, such as parking and toll systems, are rapidly expanding along with the expansion of smart devices and internet enabled vehicles. Such systems may offer features such as synchronized directions to a reserved parking spot, premium versus economy parking in the same lot, hourly billing, exclusive travel lanes, and other features that require the system to pair a subscriber or user's account with the vehicle accepting the service. This allows proper access to be pushed to the vehicle, charges to be made, or in some cases, notifications sent to maintenance or towing staff and/or police. In high traffic areas such as a busy parking lot with several simultaneous subscribers, some infrastructure sensor systems do not have enough information to properly distinguish between vehicles, and are thus unable to ensure the correct users are getting the services they are allocated. Such systems may require the customer to report the service received, such as parking spot number, which disrupts the otherwise automated nature of the service.

The parking system 10 utilizes both detected motion data from the sensor 30 and motion data broadcast from the vehicle 26 to determine a unique match between the vehicles observed in the environment and the particular subscriber's vehicle. Smart vehicles or smart devices that are actively subscribed to the infrastructure-based service will broadcast their dynamic motion data. This dynamic motion data may be speed, acceleration, angular velocity or yaw rate, or steering angle, for example. The infrastructure system then distinguishes among vehicles by matching motion data histories. Once the infrastructure system has identified a particular vehicle, it can send detailed directions to the subscriber, such as directions to an open parking space.

Figure 2:
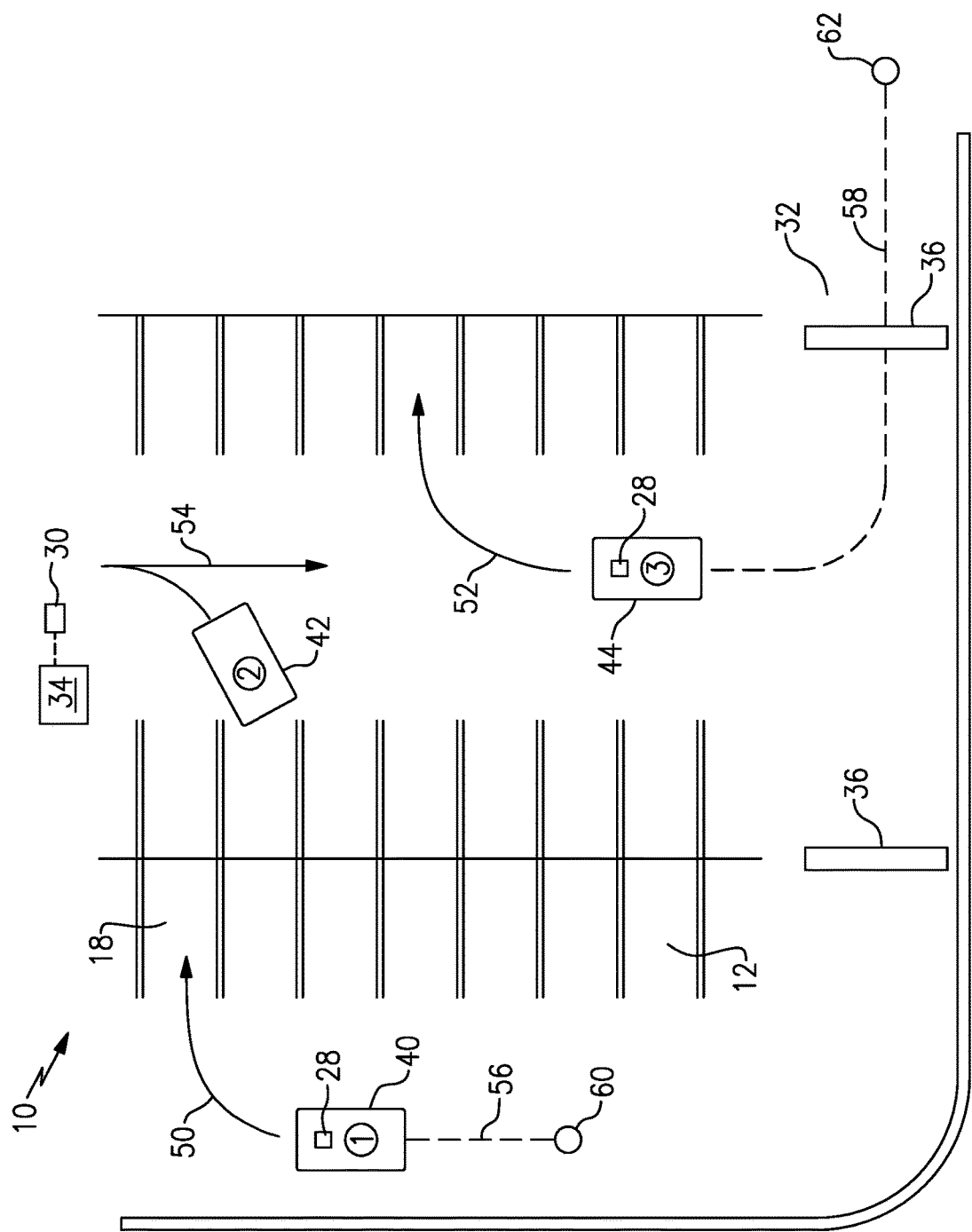
FIG. 2 schematically illustrates vehicle movement in the example smart parking lot system.

FIG. 2 schematically illustrates an example parking system 10 with several vehicles 40, 42, 44 moving through the system 10. In this example, there are three vehicles 40, 42, 44 detected by the sensor 30 that are moving within the system 10. In this example, vehicles 40, 44 have vehicle units 28 that are broadcasting data to the computing module 34. The vehicle 40 has connected with the system 10 at point 60. Thus, the vehicle 40 did not connect to the system 10 until after it had already entered the parking lot. The vehicle 44 connected with the system at point 62. Thus, the vehicle 44 connected to the system 10 before passing through an entrance 32 of the parking lot. Thus, there will be a longer time period of broadcast data for vehicle 44 than for vehicle 40. Vehicle 42 is not broadcasting data to the computing module 34 via a vehicle unit 28.

The computing module 34 gathers detected motion data for each of the vehicles 40, 42, 44 within the system 10. Each vehicle 40, 42, 44 has a unique path 50, 54, 52, respectively. Each path 50, 54, 52 will result in unique motion data for the respective vehicle. Motion for each vehicle 40, 42, 44 is detected by the sensor 30, and motion is broadcast for each vehicle that is connected to the system 10. The detected and broadcast data are then compared to identify particular vehicles. For example, the data may be compared to identify which vehicle is a target vehicle.

Figure 3:
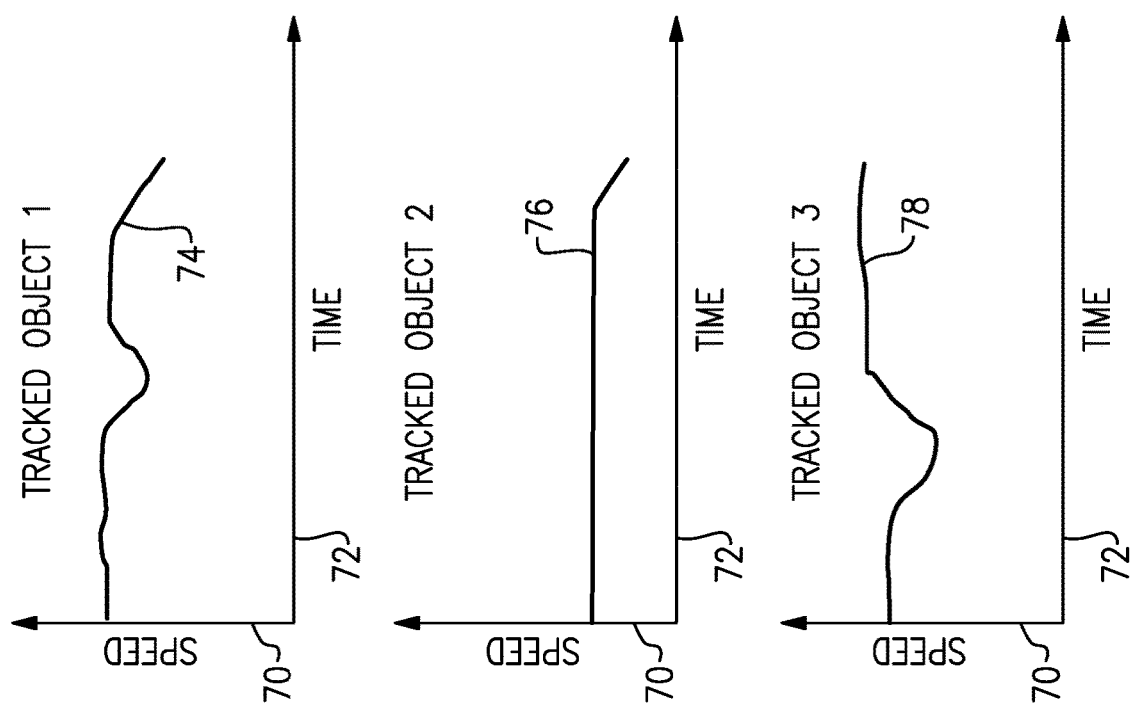
FIG. 3 illustrates example vehicle speed data.
Figure 3:
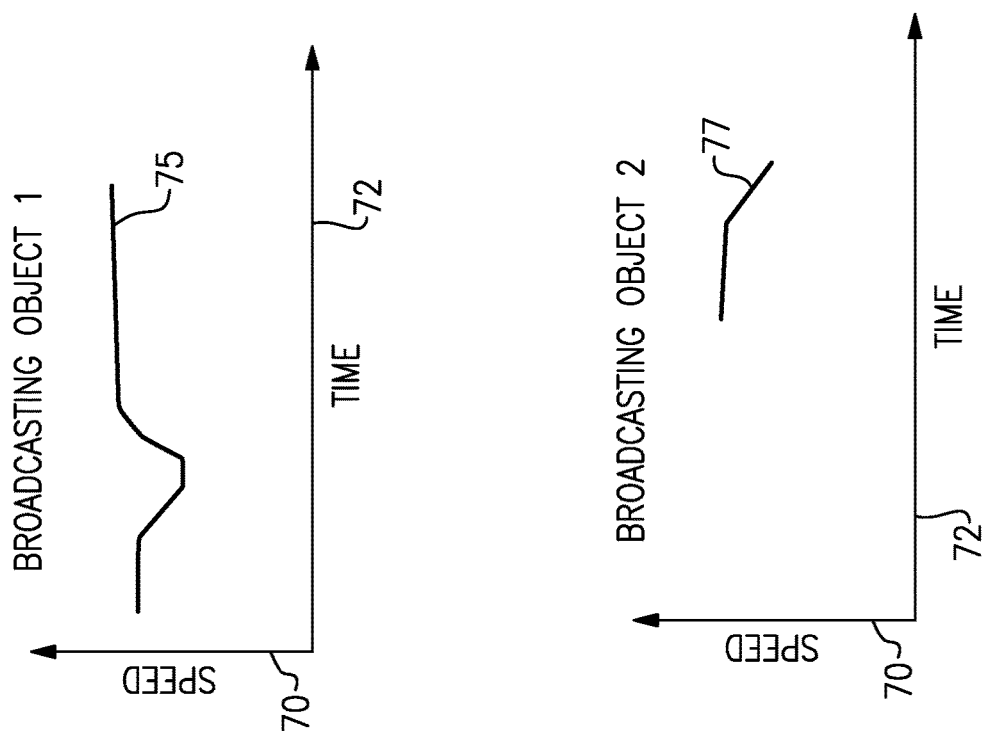
Figure 4:
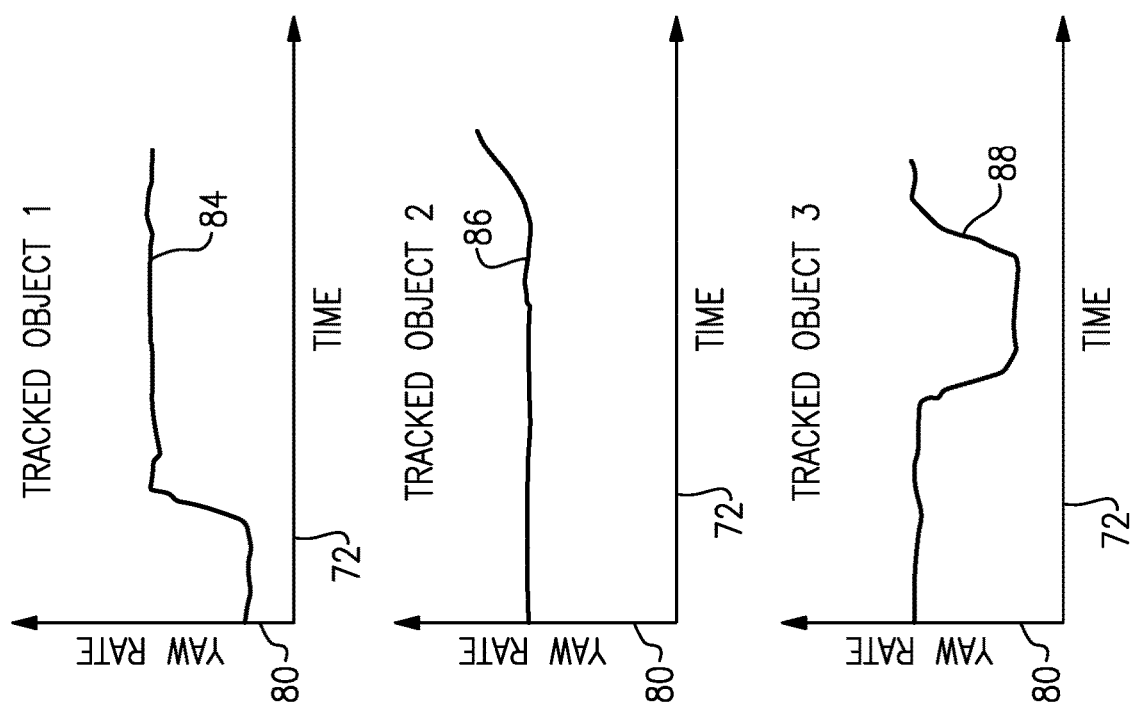
FIG. 4 illustrates example yaw rate data.
Figure 4:
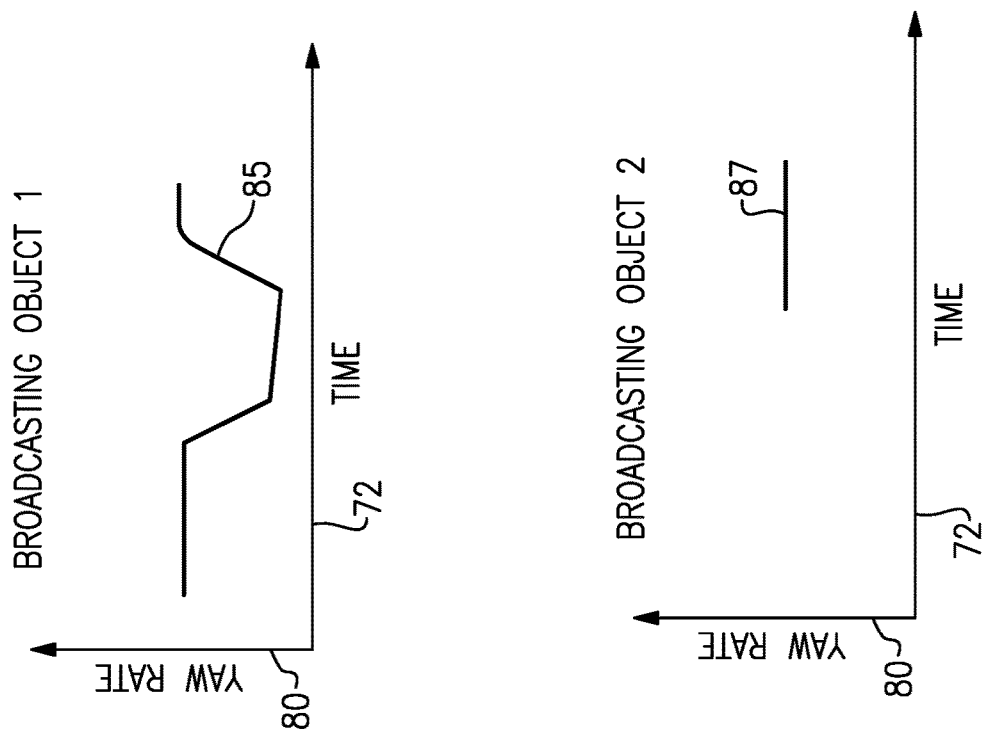
Figure 5:
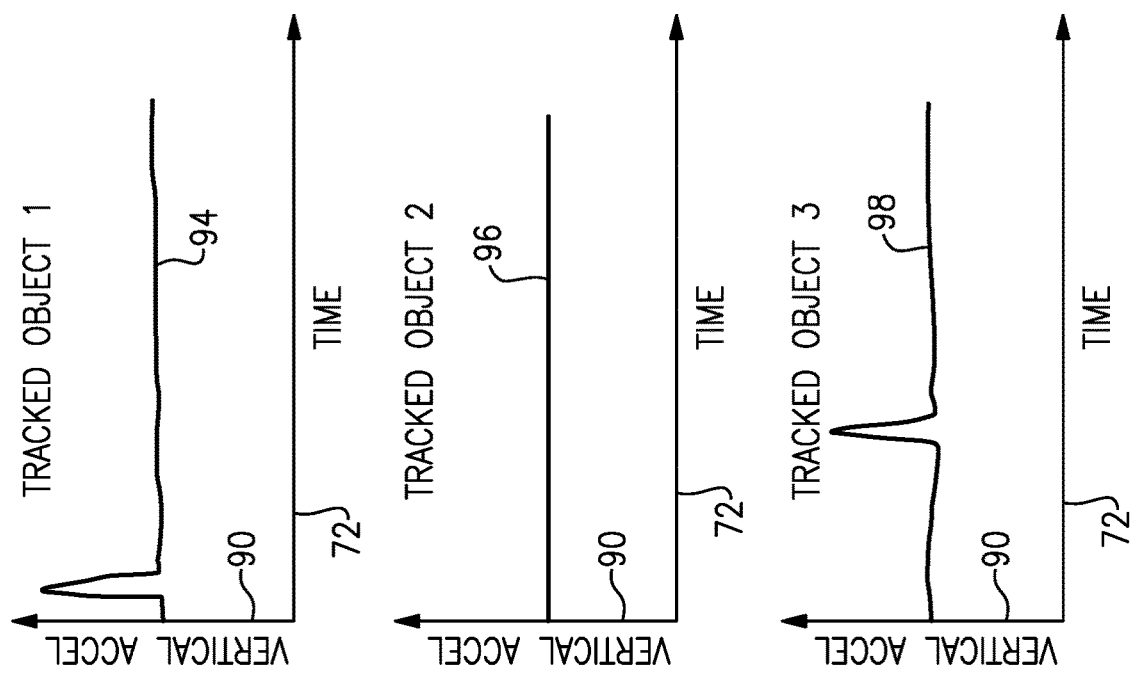
FIG. 5 illustrates example vertical acceleration data.
Figure 5:
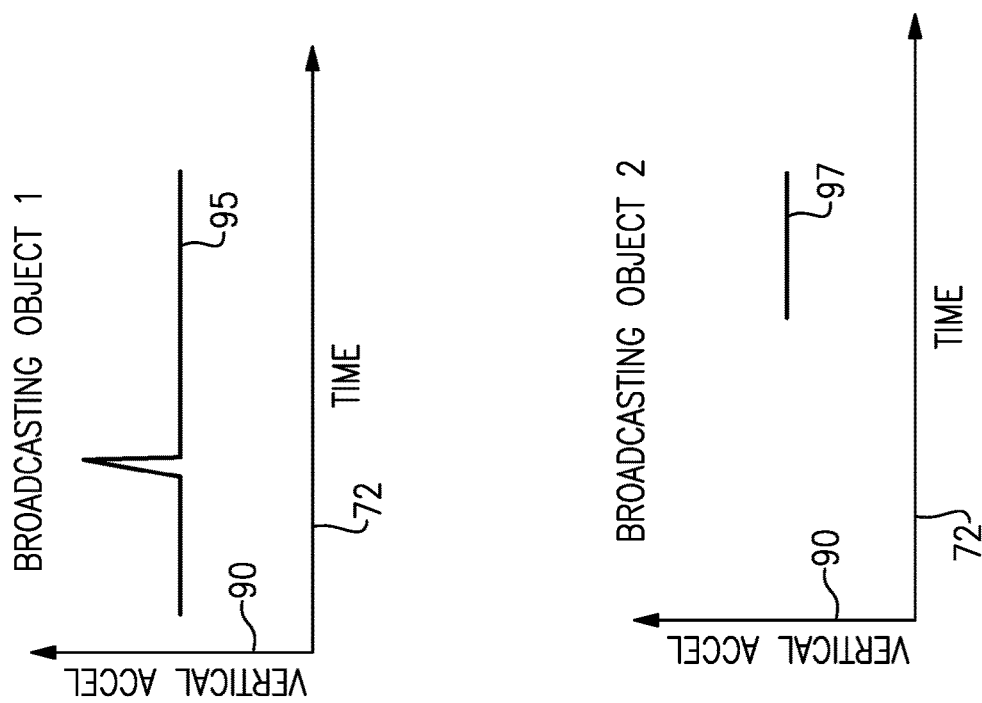

FIGS. 3-5 illustrate examples of detected motion data and broadcast motion data for vehicles within the system 10. FIG. 3 illustrates example speed 70 over time 72 data for several tracked and broadcasting vehicles. The speed over time 74, 76, 78 of tracked objects 1, 2, and 3 is the detected speed of the vehicles 40, 42, 44 detected by the sensor 30. The speed over time 75, 77 for broadcasting objects 1 and 2 are the broadcast speed of vehicles 40, 44 after they are connected to the system 10. In some examples, the broadcast data may be over a shorter time if the broadcasting vehicle does not connect to the system 10 right away. The computing module 34 compares the data for tracked objects 1, 2, 3 with the data for broadcasting objects 1 and 2 to identify which of the tracked objects are which. Here, based on the speed data, the computing module 34 is able to determine that broadcasting object 1 corresponds to tracked object 3, and broadcasting object 2 corresponds to tracked object 1.

FIG. 4 illustrates example yaw rate 80 over time 72 data for several tracked and broadcasting vehicles. The yaw rate over time 84, 86, 88 of tracked objects 1, 2, and 3 is the detected yaw rate of the vehicles 40, 42, 44 detected by the sensor 30. The yaw rate over time 85, 87 for broadcasting objects 1 and 2 are the broadcast yaw rate of vehicles 40, 44 after they are connected to the system 10. The computing module 34 compares the data for tracked objects 1, 2, 3 with the data for broadcasting objects 1 and 2 to identify which of the tracked objects are which. Here, based on the yaw rate data, the computing module 34 is able to determine that broadcasting object 1 corresponds to tracked object 3, and broadcasting object 2 corresponds to tracked object 1.

FIG. 5 illustrates example vertical acceleration 90 over time 72 data for several tracked and broadcasting vehicles. The vertical acceleration over time 94, 96, 98 of tracked objects 1, 2, and 3 is the detected vertical acceleration of the vehicles 40, 42, 44 detected by the sensor 30. The vertical acceleration over time 95, 97 for broadcasting objects 1 and 2 are the broadcast vertical acceleration of vehicles 40, 44 after they are connected to the system 10. Here, the changes in vertical acceleration generally correspond to speed bumps 36 (shown in FIG. 2) within the system 10. The computing module 34 compares the data for tracked objects 1, 2, 3 with the data for broadcasting objects 1 and 2 to identify which of the tracked objects are which. Here, based on the vertical acceleration data, the computing module 34 is able to determine that broadcasting object 1 corresponds to tracked object 3, and broadcasting object 2 corresponds to tracked object 1 or 2. In this case, since the data 97 could correspond to the data 94 or 96, additional parameters may be needed to help identify particular vehicles. The computing module 34 may also have stored data regarding the location of speed bumps 36 to help identify particular vehicles within the system 10 based on the vehicle location during changes in vertical acceleration. Although the illustrated example shows speed bumps 36 as the primary changes in vertical acceleration, other features of the system 10 may impact vertical acceleration, such as pot holes and hills.

In some of these examples, a single motion parameter is sufficient to identify a particular vehicle. In other examples, multiple motion parameters may be required to identify vehicles. For example, the computing module 34 may rely on any combination of the above described parameters, or additional parameters, such as steering angle. Although a parking system 10 is shown and described, it should be understood that the disclosed system and method may be used for other systems. The system may be any subscription based service for a region of a paid and/or restricted access area. The system may be a toll road, private drive, garage, or vehicle elevator, for example.

Figure 6:
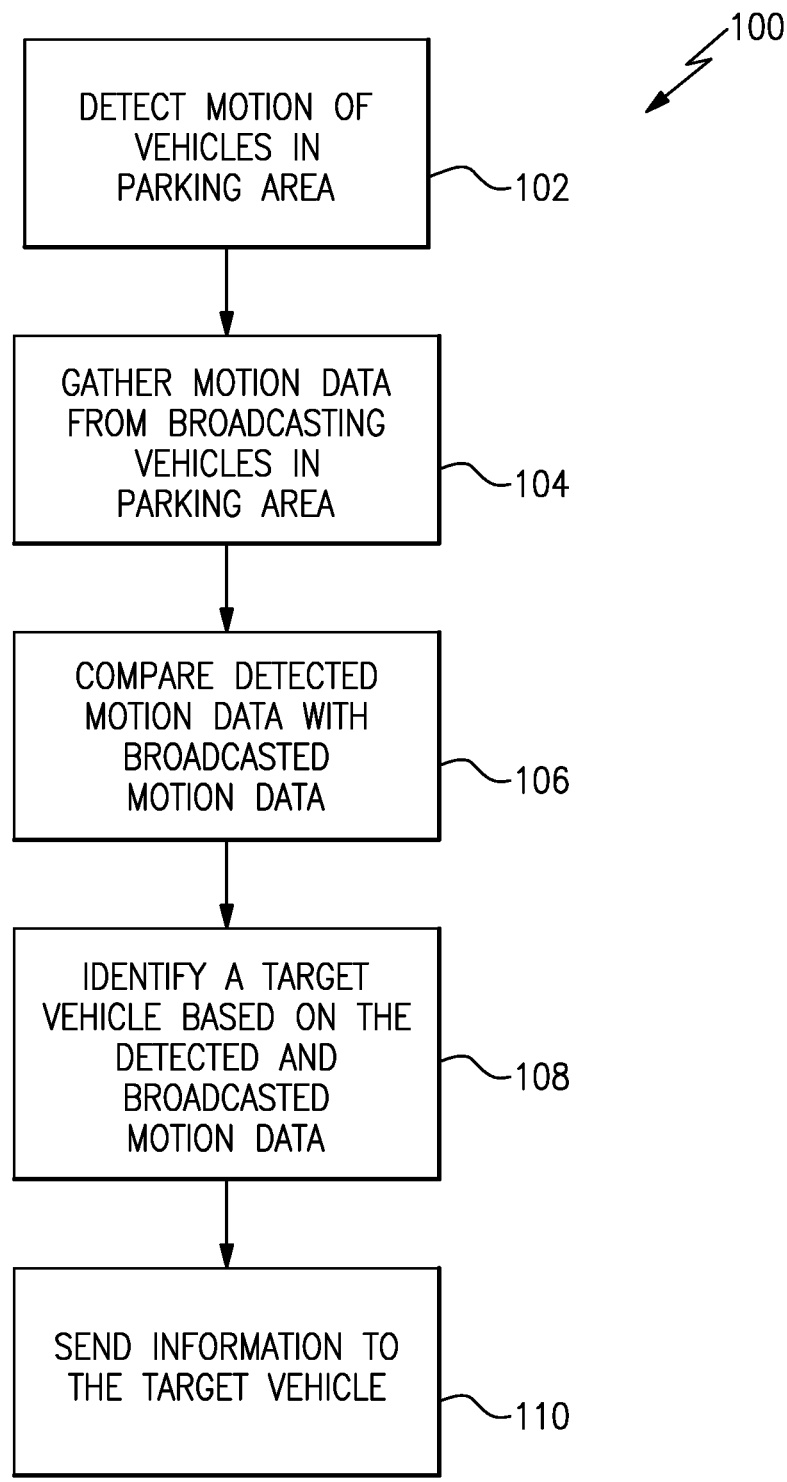
FIG. 6 illustrates an example method of identifying a target vehicle.

FIG. 6 summarizes an example method 100 of identifying vehicles within the parking system 10. Motion of vehicles 26 within the system 10 are detected with a sensor 30 at 102. The sensor 30 may detect the motion of all vehicles 28 within the system 10. In some examples, multiple sensors 30 may be utilized to detect the motion of the vehicles 28 within the system 10. This detected motion data is sent to a computing module 34. The computing module 34 also gathers broadcast motion data from broadcasting vehicles in the system 10 at 104. Broadcasting vehicles are those that send motion data from the vehicle itself to the computing system 34 via a vehicle unit 28. The computing module 34 then compares the detected motion data with the broadcast motion data at 106. Based on this comparison, the computing module 34 may identify a target vehicle at 108. The target vehicle may be a subscriber to a parking or other smart system that is broadcasting motion data, for example. In some examples, the computing module 34 may then send information to the target vehicle at 110. For example, the computing module 34 may send directions to a parking space, or other information useful to the subscriber. This method utilizes motion data from both a static sensor 30 within the system 10 and motion data from the vehicle itself broadcast via a vehicle unit 28 to identify vehicles within the system.

The disclosed system and method provides a way to identify vehicles within a parking lot or other system. Some known systems rely on a link to vehicle license plate or other identifying features of the vehicle. These known systems may intrude on a user's privacy by monitoring and tracking particular features of the user and/or user's vehicle. These systems may also require a link between a subscriber's account and a particular vehicle, which may be inconvenient for user's with multiple vehicles or driving a rental car. When the vehicle unit 28 is a mobile device, such as a smart phone, a subscriber can use a single account for multiple vehicles. The disclosed system may also be used to communicate with drivers of the vehicle about features in the parking lot. For example, handicapped or premium parking spaces may be reserved digitally, and communicated to subscribers through the vehicle unit 28. In other words, during busy times, when a normally handicapped space is not being used, the system 10 may choose to make that space into a normal parking space to accommodate more vehicles in the parking lot. This information may be communicated to subscribers using vehicle units 28, and improve efficiency of the parking system 10.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of identifying a target vehicle in a system, comprising:
    providing a sensor within the system;
    detecting, by a computing module of the system, motion data of a plurality of vehicles within the system with the sensor;
    receiving, by the computing module, broadcast motion data from a vehicle unit of each of the plurality of vehicles within the system; the computing module being in communication with the sensor and the vehicle unit of each of the plurality of vehicles; and
    determining, by the computing module, which of the plurality of vehicles is a target vehicle based on a comparison of the detected motion data from the sensor and the broadcast motion data from the vehicle unit of each of the plurality of vehicles.

2. The method of claim 1, wherein the detected motion data and the broadcast motion data have the same parameters.

3. The method of claim 1, wherein the detected motion data and the broadcast motion data comprise a vehicle speed.

4. The method of claim 1, wherein the detected motion data and the broadcast motion data comprise a vehicle yaw rate.

5. The method of claim 1, wherein the detected motion data and the broadcast motion data comprise a vertical acceleration.

6. The method of claim 1, wherein the detected motion data and the broadcast motion data comprise at least two parameters.

7. The method of claim 1, wherein the computing module sends information to the target vehicle via the corresponding vehicle unit.

8. The method of claim 1, wherein the vehicle unit communicates with the computing module wirelessly.

9. The method of claim 1, wherein the vehicle unit is mounted within each of the plurality of vehicles.

10. The method of claim 1, wherein the vehicle unit is a mobile device located within each of the plurality of vehicles.

11. The method of claim 1, comprising providing a plurality of sensors within the system.

12. The method of claim 1, wherein the system is a portion of a paid or restricted access area.

13. A system for identifying a target vehicle within a system, comprising:
    a sensor configured to detect motion data of a plurality of vehicles within the system;
    a vehicle unit mounted on each vehicle of the plurality of vehicles, the vehicle unit tracking motion data of the corresponding vehicle and broadcasting the tracked motion data to a computing module of the system; and
    the computing module in communication with the sensor and the vehicle unit of each of the plurality of vehicles, the sensor sending the detected motion data to the computing module, and the vehicle unit broadcasting the tracked motion data of the corresponding vehicle to the computing module, wherein the computing module identifies a vehicle of the plurality of vehicles as a target vehicle based on a comparison of the detected motion data from the sensor and the broadcast motion data from the vehicle unit of each of the plurality of vehicles.

14. The system of claim 13, wherein the detected motion data and the broadcast motion data comprise at least one of a vehicle speed, a vehicle yaw rate, and a vertical acceleration.

15. The system of claim 14, wherein the detected motion data and the broadcast motion data comprise at least two parameters.

16. The system of claim 13, wherein the vehicle unit from each of the plurality of vehicles communicates with the computing module wirelessly.

17. The system of claim 13, wherein the computing module sends information to the target vehicle via the corresponding vehicle unit.

* * * * *